(12) United States Patent
Togawa

(10) Patent No.: US 8,195,925 B2
(45) Date of Patent: Jun. 5, 2012

(54) APPARATUS AND METHOD FOR EFFICIENT CACHING VIA ADDITION OF BRANCH INTO PROGRAM BLOCK BEING PROCESSED

(75) Inventor: Atsushi Togawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1113 days.

(21) Appl. No.: 12/051,260

(22) Filed: Mar. 19, 2008

(65) Prior Publication Data

US 2008/0235499 A1    Sep. 25, 2008

(30) Foreign Application Priority Data

Mar. 22, 2007    (JP) ................................. 2007-075629

(51) Int. Cl.
*G06F 9/44* (2006.01)
(52) U.S. Cl. ........................ 712/233; 712/205
(58) Field of Classification Search ........................ None
See application file for complete search history.

(56) References Cited

U.S. PATENT DOCUMENTS

| | | | | |
|---|---|---|---|---|
| 5,603,045 | A * | 2/1997 | Dockser ........................ | 712/233 |
| 5,729,711 | A * | 3/1998 | Okamoto ...................... | 711/205 |
| 6,216,213 | B1 * | 4/2001 | Breternitz et al. ............. | 711/170 |
| 6,622,300 | B1 * | 9/2003 | Krishnaswamy et al. ..... | 717/130 |
| 6,725,335 | B2 * | 4/2004 | Bala et al. ..................... | 711/125 |
| 6,799,315 | B2 * | 9/2004 | Waki et al. .................... | 717/148 |
| 2002/0029357 | A1 * | 3/2002 | Charnell et al. ................. | 714/9 |
| 2003/0115580 | A1 * | 6/2003 | Arai et al. ..................... | 717/158 |
| 2003/0204705 | A1 * | 10/2003 | Oldfield et al. ............... | 712/207 |
| 2004/0133777 | A1 * | 7/2004 | Kiriansky et al. ............. | 713/166 |
| 2004/0205307 | A1 * | 10/2004 | Pullen et al. .................... | 711/158 |
| 2004/0205718 | A1 * | 10/2004 | Reynders ....................... | 717/124 |
| 2005/0155026 | A1 * | 7/2005 | DeWitt et al. ................. | 717/158 |
| 2005/0204349 | A1 * | 9/2005 | Lewis et al. ................... | 717/162 |
| 2006/0040976 | A1 * | 2/2006 | Matsumoto et al. .......... | 514/303 |
| 2006/0075394 | A1 | 4/2006 | Iwamoto | |
| 2007/0089106 | A1 * | 4/2007 | Lobo et al. .................... | 717/162 |
| 2007/0283333 | A1 * | 12/2007 | Sakai ............................ | 717/140 |
| 2008/0313624 | A1 | 12/2008 | Iwamoto | |
| 2011/0320785 | A1 * | 12/2011 | Chen et al. .................... | 712/233 |
| 2011/0320786 | A1 * | 12/2011 | Chen et al. .................... | 712/233 |

FOREIGN PATENT DOCUMENTS

JP    2006107497 A    4/2006

OTHER PUBLICATIONS

Office action for corresponding Japanese application 2007-075629, dated Apr. 7, 2009.

* cited by examiner

*Primary Examiner* — Keith Vicary
(74) *Attorney, Agent, or Firm* — Matthew B. Dernier, Esq.; Gibson & Dernier LLP

(57) ABSTRACT

A main memory stores cache blocks obtained by dividing a program. At a position in a cache block where a branch to another cache block is provided, there is embedded an instruction for activating a branch resolution routine for performing processing, such as loading of a cache block of the branch target. A program is loaded into a local memory in units of cache blocks, and the cache blocks are serially stored in first through nth banks, which are sections provided in the storage area. Management of addresses in the local memory or processing for discarding a copy of a cache block is performed with reference to an address translation table, an inter-bank reference table and a generation number table.

12 Claims, 12 Drawing Sheets

APPARATUS AND METHOD FOR EFFICIENT CACHING VIA ADDITION OF BRANCH INTO PROGRAM BLOCK BEING PROCESSED

BACKGROUND OF THE INVENTION

1. Field of the Invention

The present invention relates to an information processing technique, and particularly to an information processor that is provided with a memory having a hierarchical structure, and an information processing method applicable to the information processor.

2. Description of the Related Art

Due to the advances in information processing techniques of recent years, a wide variety of functions can be easily implemented on an information processor by activating, for example, software recorded in CD-ROMs or other recording media, or software downloaded from servers on networks. Under such circumstances, efficient and high-speed processing of programs has continued to be an important issue.

To enable high-speed processing, there needs to be not only improvement in the performance of processors but also improvement in the data transfer rate between units in an information processor, such as between processor units or between a processor unit and a memory. One technique for enabling a processor's fast access to data or a program stored in a memory is to hierarchize the memory using a cache memory. Generally, a cache memory has a capacity smaller than that of a main memory and enables fast access. By storing frequently accessed data in a cache memory, the number of accesses to the main memory can be decreased, thereby reducing the overall time required for data access. Also in a multiprocessor system comprising multiple processors, local memories provided in respective processors enable fast access to a greater amount of data.

In order for a processor to process a program faster, the processor also needs to access the machine code faster. However, since a memory for enabling fast access, i.e. a high-speed memory, generally has a small capacity, programs often cannot be stored entirely therein depending on the size of the program. In such case, a programmer needs to manually divide the program into multiple modules and also describe a program for loading such modules at appropriate times from the main memory into the high-speed memory.

SUMMARY OF THE INVENTION

The present invention has been made in view of such a problem, and a general purpose thereof is to provide a technique for enabling fast and efficient access to a program.

One aspect of the present invention relates to an information processing apparatus. The information processing apparatus comprises: a main memory which stores a plurality of program blocks obtained by dividing one program; a local memory which stores a copy of at least one of the plurality of program blocks; and a processor which loads a program in units of the program blocks from the main memory and performs processing with reference to a copy of a program block stored in the local memory, wherein, when it is necessary during the execution of the copy of the program block to cause the process to branch to an instruction described in another program block, the processor performs a branch resolution routine for determining if a copy of the program block of the branch target exists within the local memory, and, if such copy does not exist, loading the program block of the branch target from the main memory, and stores a copy of the program block of the branch target in the local memory.

Another aspect of the present invention relates to an information processing method. The information processing method comprises: performing processing with reference to a program block, which is part of a program, stored in a local memory; determining, when it is necessary in the performing processing to cause the process to branch to an instruction described in another program block, whether or not the another program block is stored in the local memory, and, if such program block is not stored, loading the another program block from a main memory; and causing the process to branch to the another program block loaded.

Optional combinations of the aforementioned constituting elements, and implementations of the invention in the form of methods, apparatuses, systems and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
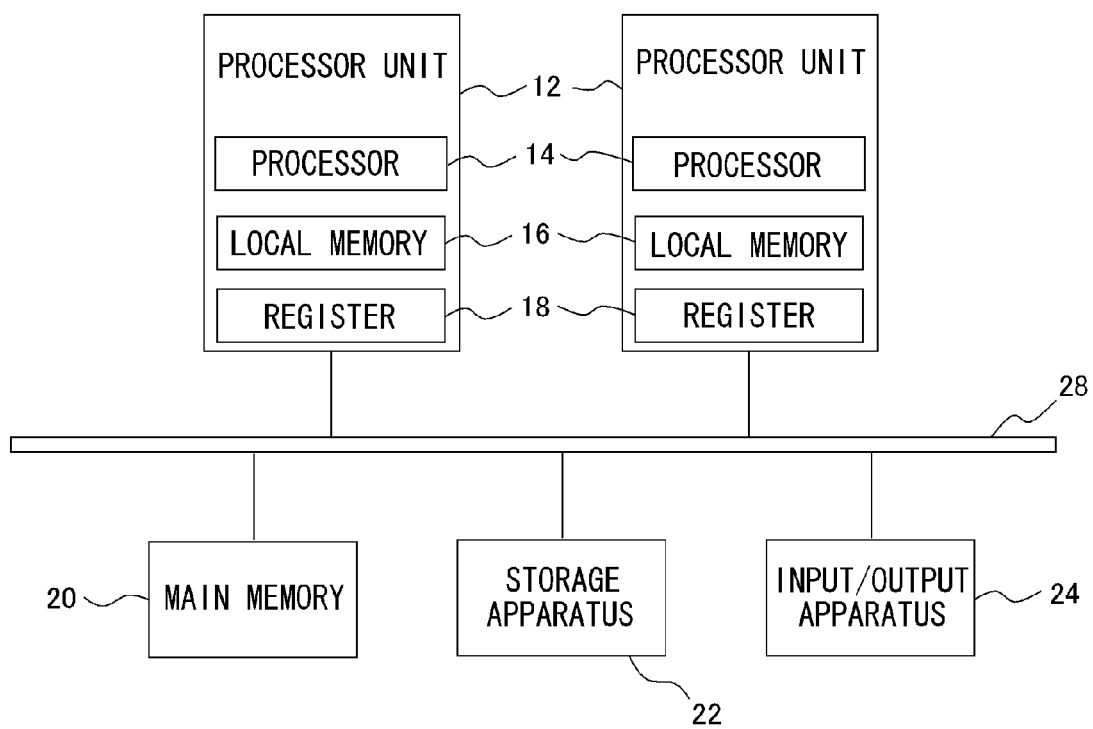
FIG. 1 is a diagram that shows the configuration of an information processing apparatus according to an embodiment.

FIG. 1 shows the configuration of an information processing apparatus according to an embodiment. An information processing apparatus 10 comprises a processor unit 12, which includes a processor 14, a local memory 16 and a register 18, a main memory 20, a storage apparatus 22, and an input/output apparatus 24, and these components perform data transmission between one another via a bus 28. The processor unit 12 may activate DMA (Direct Memory Access) in an MFC (Memory Flow Controller) to which the unit connects in order to perform data transmission, but the illustration therefor is omitted in FIG. 1

Although two processor units 12 are illustrated in FIG. 1, the number of the processor units 12 is not limited to two and may also be one or above two. Also, each of the processors 14 may perform an equal function so as to perform multiple processes or threads in parallel, or there may be included a processor performing a certain function, such as a graphic processor or an I/O processor.

The processor 14 in the processor unit 12 executes a program including application software activated by a user. The local memory 16 is configured, for example, with an SRAM (Static Random Access Memory) capable of high-speed access and arranged together with the processor 14 on the same chip or arranged near the processor 14; in the local memory 16 are stored part of an application program loaded into the main memory 20, data necessary for processing or data resulting from processing, as needed. The register 18 may be a common register which temporarily retains a value necessary for processing in the processor 14. In the present embodiment, the register 18 also stores data or stacks for managing programs stored in the local memory 16.

The main memory 20 is configured, for example, with a DRAM (Dynamic Random Access Memory) and stores the entirety of a program including an application activated by a user. The main memory 20 may also perform a function as a shared memory for exchanging data between multiple processor units 12, or a function as a system memory for operating an OS. The storage apparatus 22 may be a common storage apparatus, such as a hard disk, or recording media such as CD-ROMs and a drive therefor, or may be a combination of such apparatuses. The storage apparatus 22 stores application programs, data necessary for processing, and data to be saved during or at the end of processing. The input/output apparatus 24 inputs a user's instruction for the information processing apparatus, such as activation of an application, or outputs a processing result. The input/output apparatus 24 may be configured with an input apparatus such as a keyboard, a controller or a pointing device, and an output apparatus such as a display apparatus, a speaker or a printer, or may be configured with combinations thereof.

In the present embodiment, a program stored in the storage apparatus 22 is once loaded into the main memory 20, and part of the program is then loaded therefrom into the local memory 16 according to the processing performed by each processor unit 12. Accordingly, the processor 14 need not re-access the main memory 20 each time the program advances, and accesses to be performed can be limited within the processor unit 12 to a maximum extent, thereby enabling high-speed software processing. Conventionally, it has been necessary in such case to divide the program into modules having sizes storable in the local memory 16 and to describe a program for loading such modules into the local memory 16 at the stage of programming.

Accordingly, it has been desired that such process becomes more efficient, particularly when creating or debugging a large and complicated program for providing advanced functions, such as game software or simulation software. In consideration thereof, the present embodiment provides a compiler for caching an instruction automatically. Accordingly, loading of modules into the local memory 16 need not be considered in programming, thereby reducing the burden on programmers. More specifically, when a program runs to an instruction that is not found in the local memory 16, the runtime routine of the compiler automatically performs the following processes:

(1) predicting an unnecessary instruction to delete it from the local memory 16; and
(2) loading a necessary instruction from the main memory 20 into the local memory 16.

Figure 2:
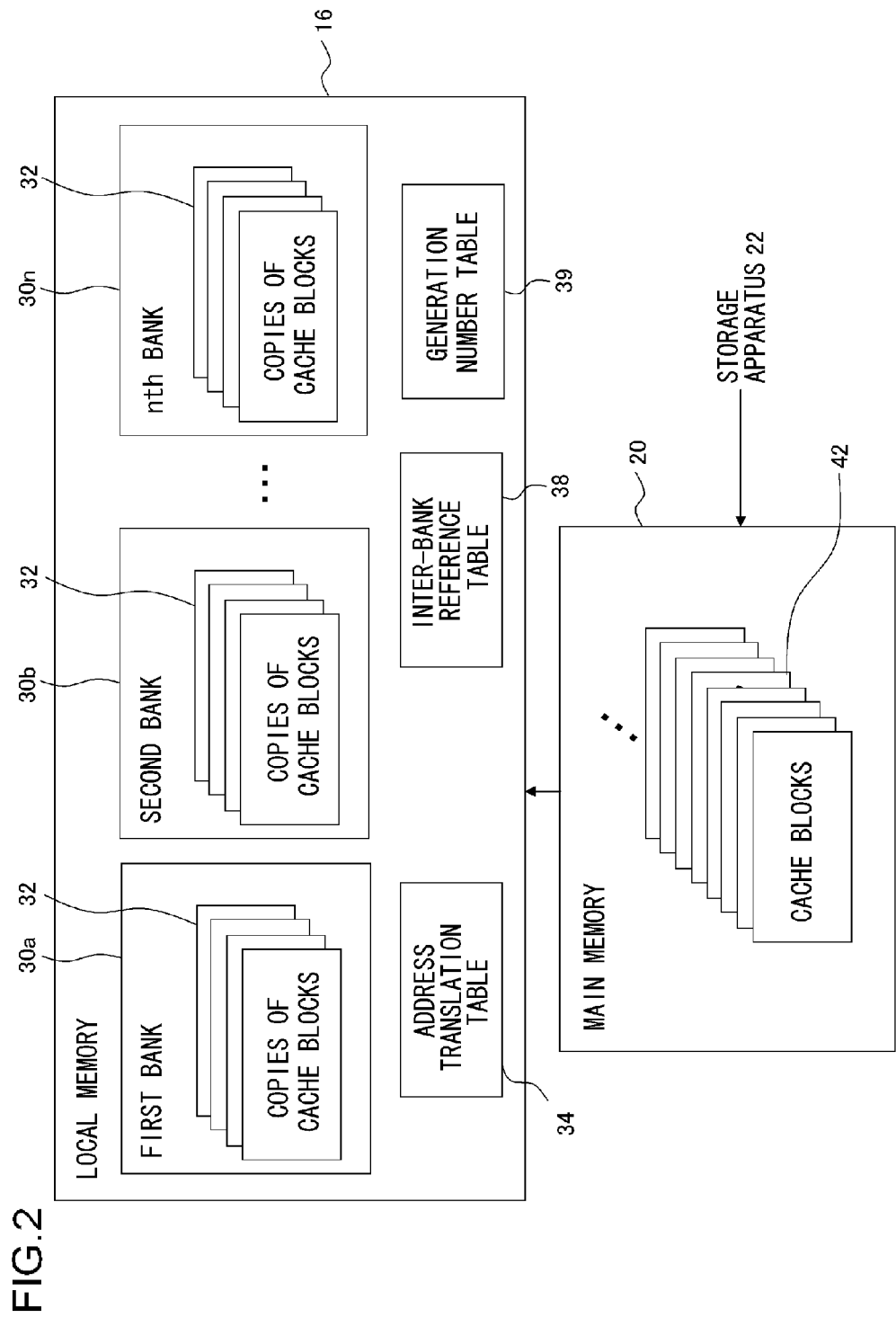
FIG. 2 is a diagram that schematically shows the structure of data stored in a local memory and a main memory in the embodiment.

FIG. 2 schematically shows the structure of data stored in the local memory 16 and the main memory 20. Into the main memory 20, a program compiled by the compiler of the present embodiment is loaded from the storage apparatus 22. When compiling a program, the compiler of the present embodiment divides the program according to a certain rule so as to create program blocks. A program is loaded from the main memory 20 into the local memory 16 in units of such blocks. The data size for each of the blocks is naturally up to the capacity of the local memory 16. Hereinafter, this block will be referred to as a cache block 42. Consequently, the main memory 20 stores multiple cache blocks 42 as programs, as shown in FIG. 2.

A program constituting one cache block 42 may be provided, for example, by dividing a sequential program at dividable positions so as to be of a size within a certain range, or by setting, according to empirical rules or the likes in advance, a group of functions that are referred to intensively and then extracting such functions from the original program when compiling it. Alternatively, cache blocks 42 may be provided by once dividing a program into basic blocks, which are larger units than functions, and then reforming the blocks in consideration of the size or processing content. The basic block here may be provided by combining functions, the minimum dividable units, or the likes according to the processing content, etc. Although it is desirable in any case that the compiler automatically creates cache blocks, a programmer may manually specify the ranges of cache blocks by calling functions or dividing positions set in advance so that the programmer's intention can be partly reflected.

As stated previously, in the local memory 16 is stored at least one cache block 42 loaded from the main memory 20, that is, at least one copy 32 of a cache block. Since a copy 32 of a cache block is part of a program, there may be a need, during processing with reference to a copy 32 of a cache block, to branch to an instruction or to call a function in a copy 32 of another cache block. If the copy 32 of the cache block of the branch target does not exist in the local memory 16 in such case, the corresponding cache block 42 in the main memory 20 is identified and copied into the local memory 16 through a routine provided by the compiler. The routine for performing such processing is referred to as a branch resolution routine. The specific procedure of the branch resolution routine will be described later.

The local memory 16 is provided with n storage areas defined as a first bank 30a, a second bank 30b, . . . , and an nth bank 30n. Copies 32 of cache blocks loaded from the main memory 20 are serially stored in the storage areas starting with the top address of the first bank 30a. When there is caused a shortage of unused areas as the storing proceeds, i.e. when a copy 32 of a cache block cannot be newly stored in the nth bank 30n, which is the last bank, all the copies 32 of cache blocks previously stored in the first bank 30a are discarded (hereinafter such processing will be called "bank invalidation"), and copies 32 of new cache blocks are then serially stored therein. Thereafter, the second through nth banks 30b-30n are serially invalidated and reused.

As shown in FIG. 2, the local memory 16 also stores an address translation table 34, an inter-bank reference table 38 and a generation number table 39, besides copies 32 of cache blocks. The address translation table 34 relates an address in the main memory 20 at which a cache block 42 is stored, to an address in the local memory 16 at which a copy of the cache block is stored; the table is referred to when the processor 14 identifies the address of a copy 32 of a cache block of a branch target in the local memory 16 to refer to the copy, or when the processor 14 determines whether or not a copy 32 of a necessary cache block exists within the local memory 16.

One inter-bank reference table 38 is provided for each of the first bank 30a, second bank 30b, . . . , and the nth bank 30n; when the inter-bank reference table 38 for the second bank 30b is considered as an example and when a copy 32 of a cache block stored in another bank, the nth bank 30n for example, provides a branch to a copy 32 of a cache block stored in its own bank, i.e. the second bank 30b, the inter-bank reference table 38 stores the position of the branch instruction sequence described in the copy 32 of the cache block providing the branch. The generation number table 39 retains a number called a generation number with respect to each bank, and the number is incremented each time the corresponding bank is invalidated. By referring to an inter-bank reference table 38 and the generation number table 39, it can be found, for example, that a bank storing a copy 32 of a cache block of a branch target has been invalidated, so that the address in the local memory 16 that has been used as the branch target becomes invalid.

Figure 3:
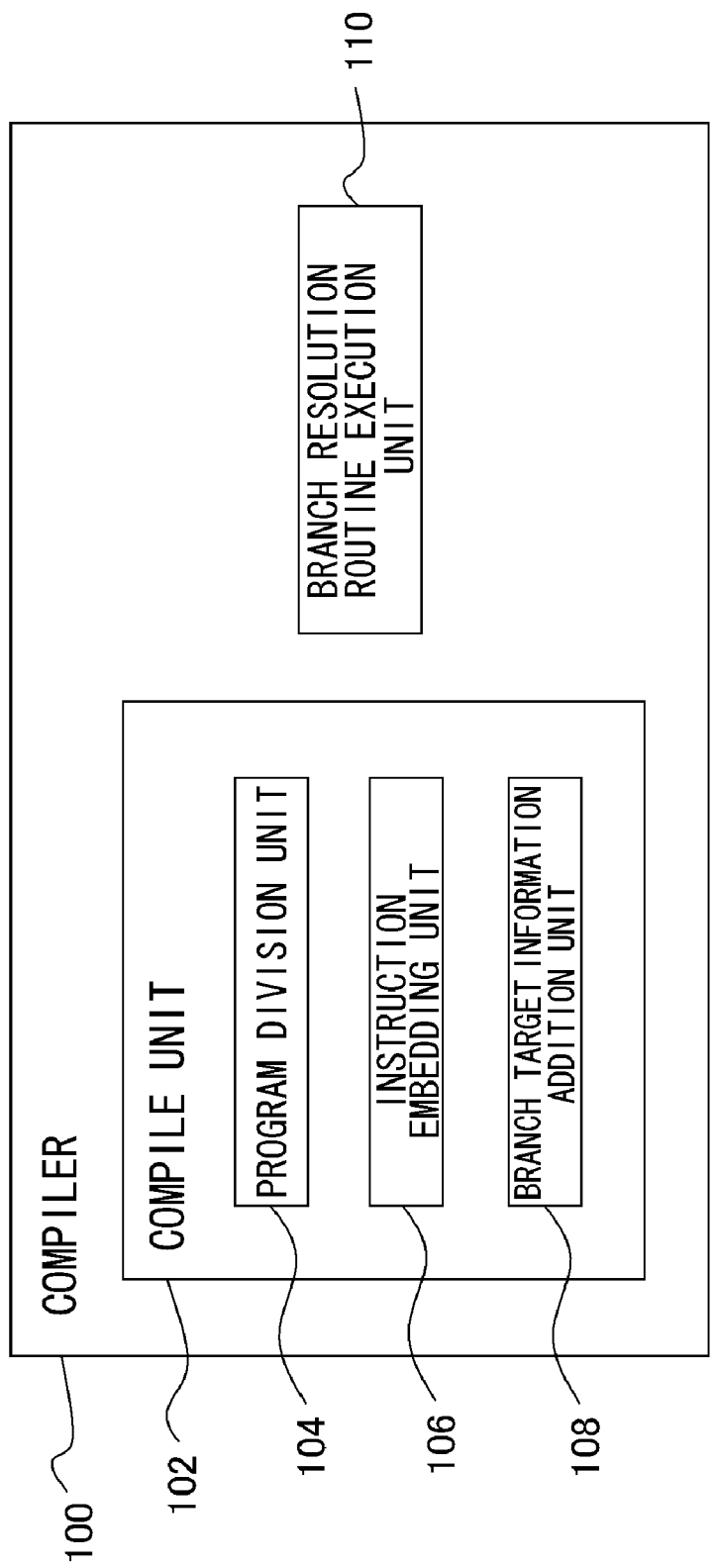
FIG. 3 is a diagram that shows the configuration of a compiler for creating a cache block and executing a branch resolution routine in the embodiment.

FIG. 3 shows the configuration of a compiler for creating a cache block to be loaded into the main memory 20 and executing a branch resolution routine. Each of the elements represented by functional blocks for performing various processes shown in FIG. 3 can be implemented by a CPU, a memory, an LSI or the like in terms of hardware, and by a program or the like in terms of software. Accordingly, it will be obvious to those skilled in the art that these functional blocks may be implemented in a variety of forms by hardware only, software only or a combination thereof, and the form is not limited to any of them. For example, a compiler 100 may be configured with part of the information processing apparatus 10 into which the corresponding software is loaded.

The compiler 100 comprises a compile unit 102 for creating cache blocks 42 from a program, and a branch resolution routine execution unit 110 for executing a branch resolution routine. The compile unit 102 includes: a program division unit 104 for dividing a program according to a certain rule as set forth previously; an instruction embedding unit 106 for embedding in a program an instruction for activating a branch resolution routine, etc. for the case where the process branches to another cache block 42; and a branch target information addition unit 108 for adding, to a cache block providing a branch, information on a cache block 42 of the branch target that is necessary for the execution of a branch resolution routine in each branch processing. The information added by the branch target information addition unit 108 will be described later.

The branch resolution routine execution unit 110 executes a branch resolution routine, which is activated by an instruction embedded by the instruction embedding unit 106. The branch resolution routine execution unit 110 may be substantially the processor 14, as the unit operates during the execution of a program activated by a user on the information processing apparatus 10.

In the following, the configurations of the cache blocks 42, address translation table 34, inter-bank reference table 38 and generation number table 39 shown in FIG. 2 will be detailed.

Figure 4:
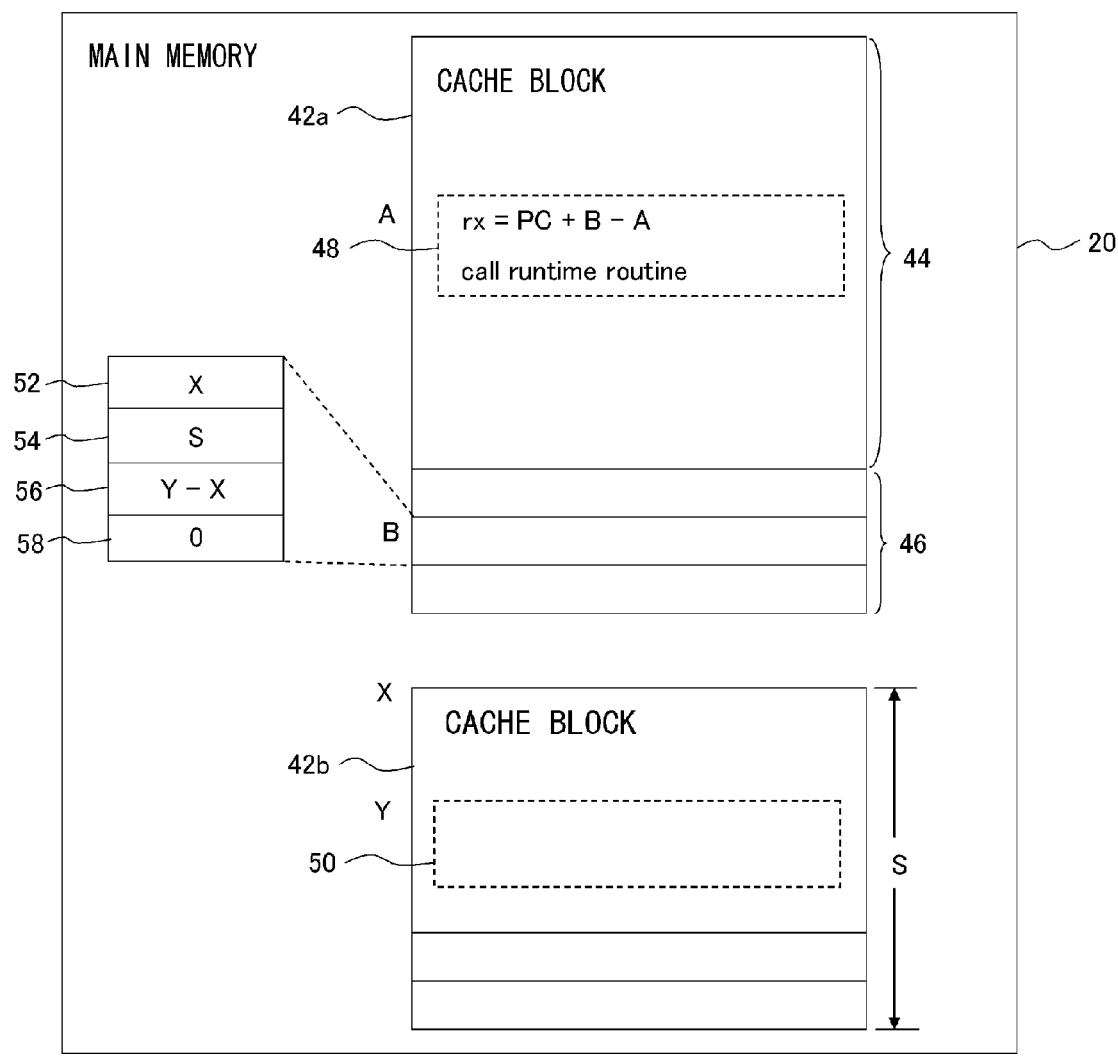
FIG. 4 is a diagram that schematically shows the structure of two cache blocks stored in the main memory in the embodiment.

FIG. 4 schematically shows the structure of two cache blocks 42a and 42b stored in the main memory 20. It is assumed here that processing in the cache block 42a branches to processing in the cache block 42b.

The cache block 42a created by the compiler 100 consists of a program body 44 obtained through the division of a program by the program division unit 104, and a branch target table 46, which is information added by the branch target information addition unit 108 of the compiler 100. This configuration is the same in each cache block 42. If a program described in the program body 44 includes a branch to another cache block 42, the information on the branch will be stored in the branch target table 46, in which one entry is provided for each branch.

Each entry in the branch target table 46 includes a branch target cache block address field 52, a branch target cache block size field 54, a branch target instruction offset field 56, and a branch type field 58. A branch target cache block address field 52 contains the top address of the cache block 42b, which stores an instruction of the branch target, in the main memory 20, so that "X" is provided in the field in the example of FIG. 4. A branch target cache block size field 54 contains the data size of the cache block 42b, so that "S" is provided in the field in the example of FIG. 4. Hereinafter, an address in the main memory 20 may be referred to as a "main address" while an address in the local memory 16 may be referred to as a "local address", so as to distinguish between the two.

A branch target instruction offset field 56 contains an offset value from the top main address of the cache block 42b to the main address at which the branch target instruction is described. In the example of FIG. 4, when it is assumed that the branch target instruction is described in the position indicated with a dotted line 50 at a main address "Y", the offset value is "Y-X". A branch type field 58 contains information for identifying the type of a branch, providing whether the branch is a simple branch or a function call. In the example of FIG. 4, "0" and "1" are assumed as the information, and "0" is provided in the field.

As stated previously, when a cache block 42a includes in its program body 44 a branch instruction to another cache block 42b, the instruction embedding unit 106 of the compiler 100 creates an instruction sequence 48 for performing the branch processing in the local memory 16 and embeds the instruction sequence in the program body 44. The instruction sequence 48 includes an instruction sequence for storing in the register an address in the local memory 16, i.e. a local address, at which an entry of the branch target table 46 providing the corresponding branch is described, and also includes an instruction sequence for activating a branch resolution routine mentioned previously. In FIG. 4, the former sequence is described as "rx=PC+B−A", and the latter as "call runtime routine".

In the sequence above, "rx" represents a value in the register, and "PC" represents a local address of the instruction sequence 48 at the time when the cache block 42a is copied into the local memory 16. The address in the local memory 16 at which the corresponding entry in the branch target table 46 is provided can be obtained by adding to "PC", the local address of the instruction sequence 48, the offset value from "A" to "B", i.e. "B−A", in which "A" represents the main address of the created instruction sequence, and "B" represents the main address of the entry.

The instruction sequence 48 may also include an instruction for performing processing in the case where the process returns from a function call but a copy 32 of the cache block of the return destination has been discarded in the local memory 16. This processing will be described later.

If a cache block 42 is formed with a group of functions included in the original program, or a group of basic blocks provided by dividing the original program, as set forth previously, there can be a case where the branch source and the branch target are both included in a single cache block 42. In such case, the branch target information addition unit 108 need not provide an entry for the branch in the branch target table 46. Also, the instruction embedding unit 106 embeds, as the instruction sequence 48, an instruction providing a simple branch to the local address of the branch target, not an instruction sequence for storing in the register the local address of the branch target table 46 or an instruction sequence for activating a branch resolution routine. This can be implemented, for example, with an instruction causing a branch to an address provided by adding "PC", the local address of the instruction sequence 48, to the offset value of the main address of the branch target.

Figure 5:
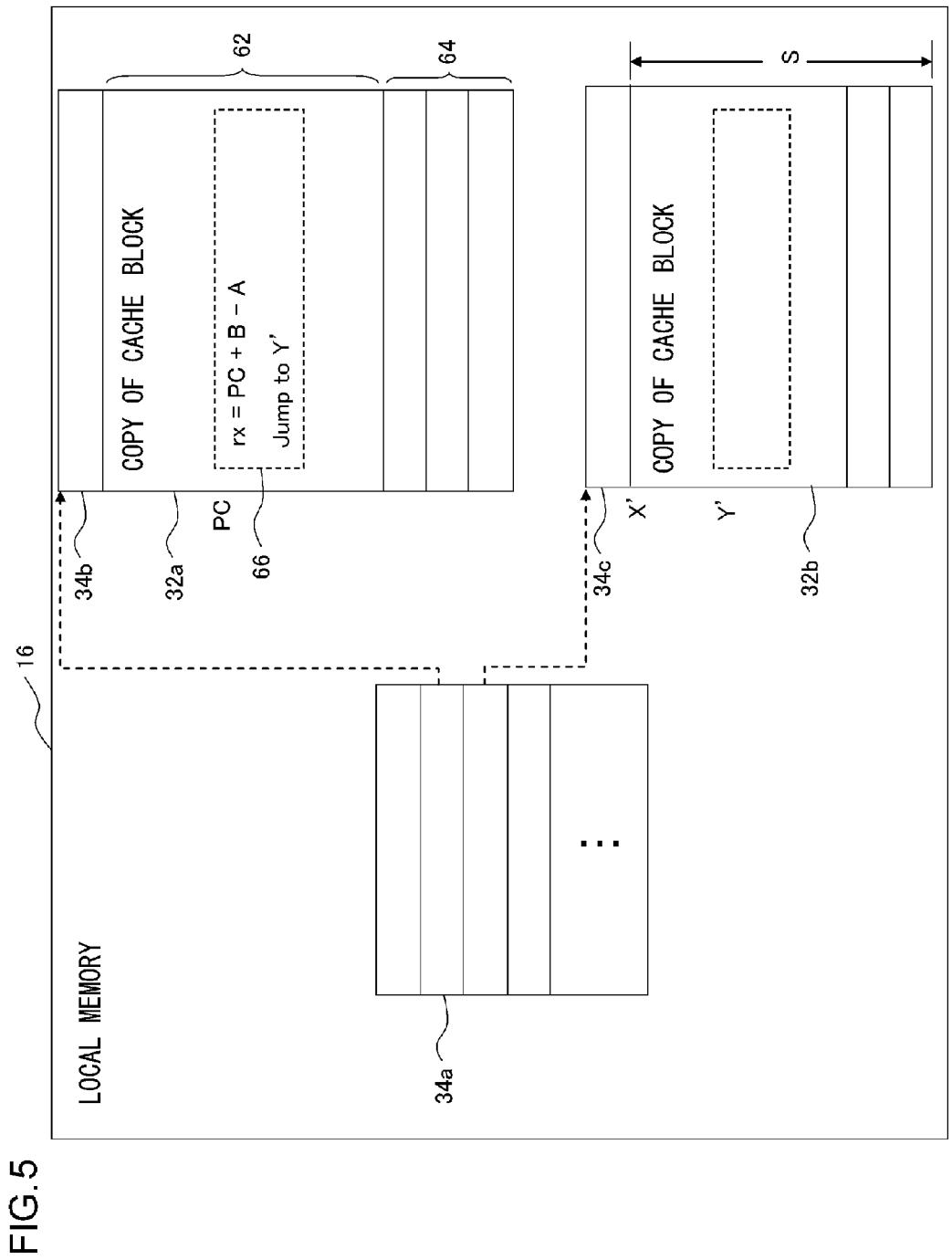
FIG. 5 is a diagram that schematically shows the structure of copies of two cache blocks and an address translation table stored in the local memory in the embodiment.

FIG. 5 schematically shows the structure of copies 32a and 32b, provided in the local memory 16, of the two cache blocks 42a and 42b in the main memory 20 shown in FIG. 4, and the address translation table 34. The address translation table 34 consists of an address translation table header portion 34a and address translation table entry portions 34b and 34c. As will be described later, when cache blocks 42a and 42b are loaded from the main memory 20 into the local memory 16, areas for storing copies 32a and 32b of the cache blocks are ensured before the address translation table entry portions 34b and 34c are written into the top areas therein, and the copies 32a and 32b of the cache blocks are then stored in the subsequent areas.

The address translation table 34 of the present embodiment is structured as a hash table so that, based on the addresses of cache blocks 42a and 42b in the main memory 20, the local addresses of copies 32a and 32b of the cache blocks can be efficiently specified. Accordingly, the address translation table header portion 34a stores pointers to the address translation table entry portions 34b and 34c provided for copies 32a and 32b of cache blocks desired, using addresses in the main memory or part of them as an index. The address translation table 34 in such instance will be detailed with reference to FIG. 6. The address translation table 34 may be of any structure other than a hash table as long as an address in the local memory 16 can be identified from an address in the main memory 20 by means of the table.

A copy 32a of a cache block also includes a program body 62 and a branch target table 64, and data to be retained therein is almost the same as that in a cache block 42a in the main memory 20. However, when the loading of the cache block 42b of the branch target is completed and the storage area for the copy 32b of the cache block is determined in the local memory 16, the branch resolution routine replaces the instruction sequence 48, which has called the routine itself, with a branch instruction sequence 66 that provides a branch to the branch target instruction. When "Y"' is the address at which the branch target instruction is described in the copy 32b of the cache block of the branch target in FIG. 5, the corresponding instruction in the instruction sequence 66 described in the copy 32a of the cache block of the branch source is replaced with the instruction "Jump to Y"'. Consequently, when the process reaches the same branch instruction thereafter, a branch to the appropriate address can be provided without the involvement of the branch resolution routine.

Figure 6:
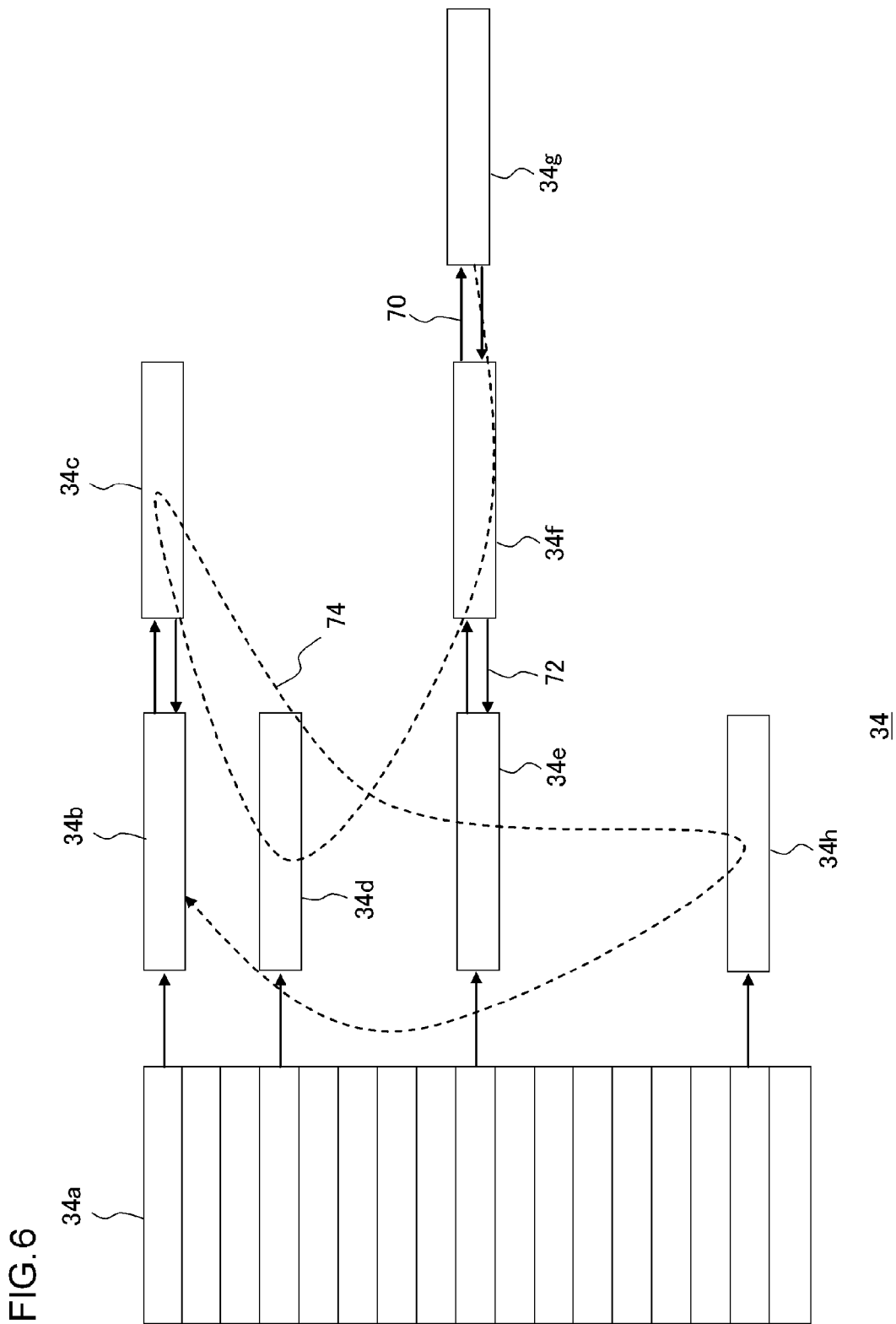
FIG. 6 is a diagram that schematically shows the structure of the address translation table in the embodiment.

FIG. 6 schematically shows the structure of the address translation table 34. As stated previously, the address translation table 34 includes the address translation table header portion 34a and address translation table entry portions 34b-34h. When a branch resolution routine is executed and a cache block 42 is newly loaded into the local memory 16, the address translation table 34 is updated while the storage area for the cache block is ensured. The address translation table 34 is updated also when a loaded copy 32 of a cache block is discarded.

The address translation table header portion 34a includes fields, each of which is provided with respect to, for example, every low-order bit of an address in the storage area for a cache block 42 in the main memory 20. When a cache block 42 that is stored in the main memory 20 at an address corresponding to one of the fields is loaded into the local memory 16, the local address of the created address translation table entry portion 34, the portion 34b for example, is written into the corresponding field in the address translation table header portion 34a.

Since each field in the address translation table header portion 34a corresponds to part of an address in the main memory 20, there can be a case where multiple cache blocks 42 stored at multiple addresses in the main memory 20 that correspond to the same field in the address translation table header portion 34a are loaded, such as the address translation table entry portions 34b and 34c illustrated in FIG. 6. Accordingly, each of the address translation table entry portions 34b-34h stores, besides the address of the respective corresponding cache blocks 42 in the main memory 20, a pointer to the local address of another address translation table entry portion, as indicated by arrows 70 and 72 of solid lines and an arrow 74 of a dotted line in FIG. 6.

More specifically, the address translation table entry portion 34f retains: the address of the cache block 42 corresponding to the portion itself in the main memory 20; the local address of the address translation table entry portion 34g connected posterior to the portion 34f in relation to the address translation table header portion 34a, as indicated by the arrow 70 of a solid line; the local address of the address translation table entry portion 34e connected anterior to the portion 34f, as indicated by the arrow 72 of a solid line; and the local address of the address translation table entry portion 34d provided for the cache block 42 that has been loaded subsequent to the cache block 42 corresponding to the portion 34f in chronological order, as indicated by the arrow 74 of a dotted line. If each of the address translation table header portion 34a and the address translation table entry portions 34b-34h has no entry connected thereto, a constant will be assigned instead of an address.

By configuring such table, a copy 32 of a desired cache block in the local memory 16 can be efficiently specified based on an address in the main memory 20. To the procedure for adding a new address translation table entry portion to the address translation table 34, a common method for adding an entry to a hash table can be applied.

Figure 7:
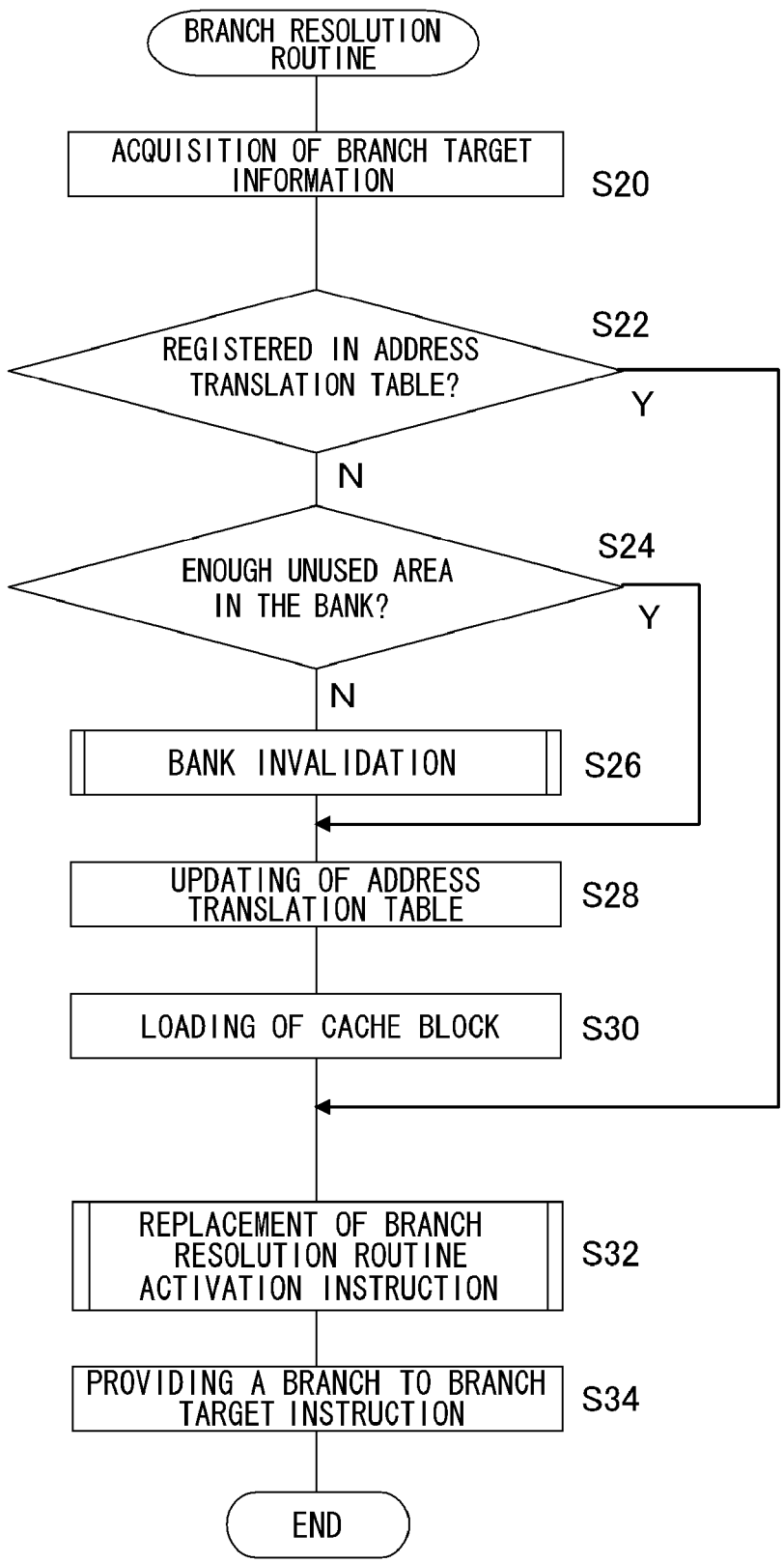
FIG. 7 is a flowchart that shows the procedure of a branch resolution routine in the embodiment.

Next, there will be described a branch resolution routine performed using the apparatus and data structure described above. FIG. 7 is a flowchart that shows the procedure of a branch resolution routine. The description will be made on the assumption that a user has instructed the information processing apparatus 10 to activate software via the input/output apparatus 24 or the like, cache blocks 42 corresponding to the software have been loaded into the main memory 20, at least one of the cache blocks 42 has been loaded into the local memory 16, and the processor 14 has been performing processing with reference to the at least one of the cache blocks.

When the process advances to an instruction for calling a branch resolution routine in a copy 32 of a cache block and the branch resolution routine is called accordingly, the processor 14, which is the entity of the branch resolution routine execution unit 110, refers to the corresponding entry in the branch target table 64 based on the address that has been stored in the register 18 through the preceding instruction sequence, and acquires the top address of the cache block 42 of the branch target in the main memory 20, the size of the cache block, the offset value of the branch target instruction, and the type of the branch (S20). The processor 14 then refers to the address translation table 34 to check if the table contains an entry retaining the address in the main memory 20 (S22). If the table does not contain such entry (N at S22), the processor 14 will determine that a copy 32 of the cache block is not included in the local memory 16 and will initiate the loading.

More specifically, the processor 14 checks if there is enough unused area in the bank where the latest loading of a copy 32 of a cache block has been made, the first bank 30a for example, to store a copy 32 of a new cache block and an address translation table entry portion therefor, the address translation table entry portion 34b for example (S24). In such occasion, if the bank to be used next, i.e., the second bank 30b, is not used yet, it is determined that there is enough unused area. If there is not enough area (N at S24), i.e., if a copy 32 of a cache block stored in the next bank, the second bank 30b, needs be discarded to store a copy 32 of the new cache block, invalidation of the second bank 30b will be performed (S26). The invalidation processing will be described later.

If an area for storing a copy 32 of the new cache block is ensured (Y at S24 or S26), an entry will be added to the address translation table 34 by creating and writing the address translation table entry portion 34b in the top of the area and updating the address translation table header portion 34a (S28). Then, based on the address in the main memory 20 acquired in S20, the cache block 42 is loaded from the main memory 20 into the ensured area in the local memory 16 (S30).

Thereafter, the instruction sequence that has called the branch resolution routine in the copy 32 of the cache block of the branch source, which has been originally processed, is replaced with a branch instruction that provides a branch to the corresponding instruction in the copy 32 of the cache block newly loaded (S32). The address of the instruction sequence of the branch target in the local memory 16 ("Y'" in FIG. 5) is obtained by adding the offset value of the instruction sequence acquired in S20 to the top local address of the copy 32 of the cache block loaded ("X'" in FIG. 5). The process is then caused to branch to the branch target instruction in the copy 32 of the cache block (S34).

If the address translation table 34 contains the corresponding entry in S22 (Y at S22), it means that a copy 32 of the cache block of the branch target exists within the local memory 16. Accordingly, the local address of the address translation table entry portion 34b is acquired from the address translation table 34 to perform processing of S32 and S34. In a branch resolution routine, a copy 32 of a cache block of a branch target could exist in the local memory 16 if the copy 32 of the cache block has been stored in the local memory 16 through a previous branch resolution routine caused by another instruction sequence.

Figure 8:
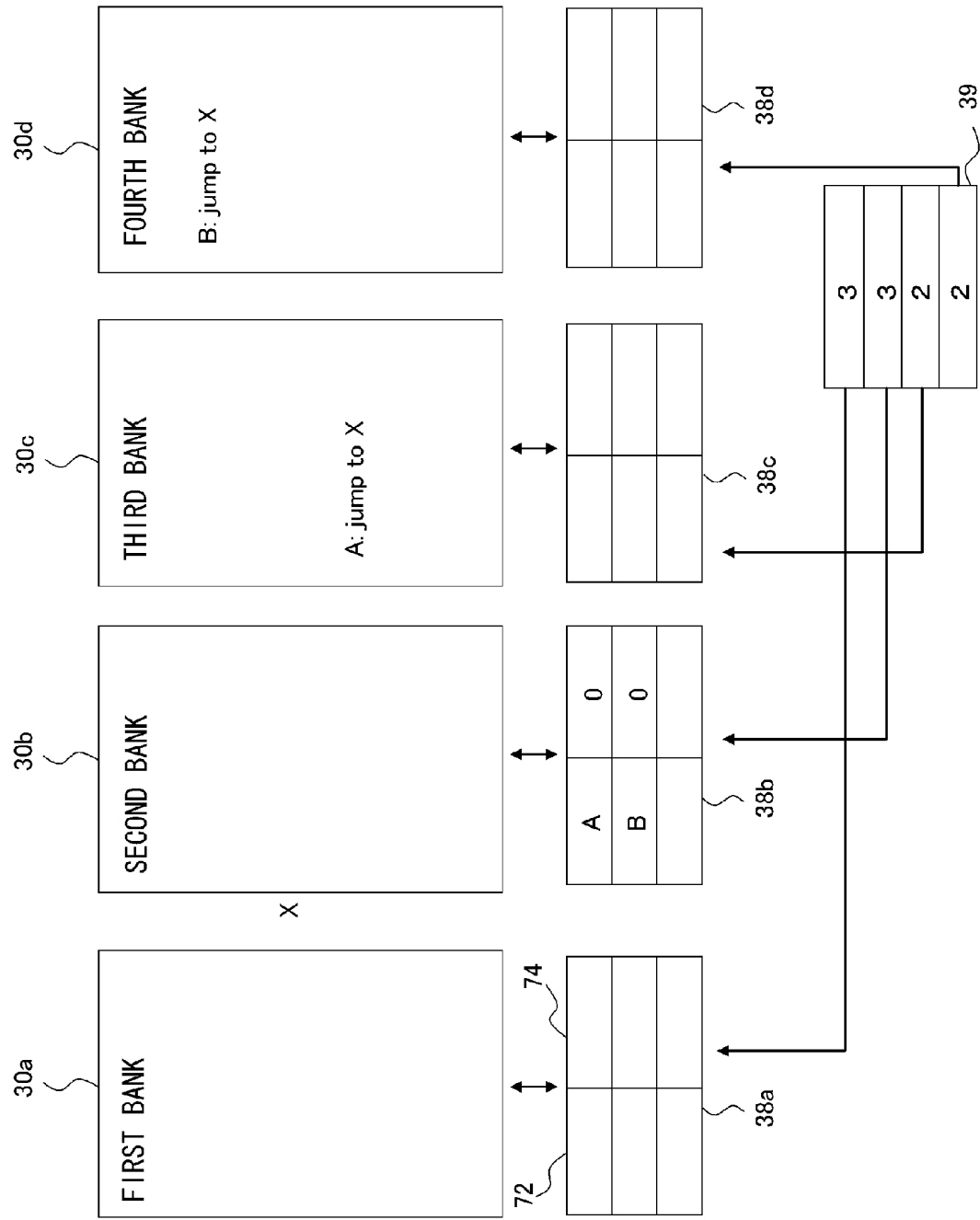
FIG. 8 is a diagram that schematically shows the relationships between a first bank, a second bank, a third bank, a fourth bank, inter-bank reference tables and a generation number table in the embodiment.

In the following, there will be described a method for managing the first through nth banks 30a-30n that store copies 32 of cache blocks in the local memory 16. FIG. 8 schematically shows the relationships between the first bank 30a, second bank 30b, third bank 30c, fourth bank 30d, inter-bank reference tables 38a, 38b, 38c and 38d related to the respective banks, and the generation number table 39. Arrows illustrated in FIG. 8 show the correspondence relationships between them.

As stated previously, cache blocks 42 of branch targets are loaded into the local memory 16 one after another during execution of a program in the present embodiment. Accordingly, if the amount of code necessary for the execution of the program exceeds the capacity of the local memory 16, more strictly the capacity available for storing copies 32 of cache blocks, there will be eventually a need to discard copies 32 of cache blocks already loaded so as to reuse the area as the storage area for copies 32 of new cache blocks.

The problem there is that branch instructions providing branches to copies 32 of cache blocks to be discarded may be found ubiquitously in all the copies 32 of cache blocks in the local memory 16. The addresses of the branch targets in the local memory 16 included in such branch instructions are made invalid at the time when the cache blocks of the branch targets are discarded. Accordingly, the branch instructions in the copies 32 of such cache blocks of the branch sources, which have been provided in S32 in FIG. 7, need be replaced again with branch resolution routine activation instructions. To perform such processing efficiently, the area for storing copies 32 of cache blocks is divided into n banks of the first through nth banks 30a-30n, so as to manage the validity of copies 32 of cache blocks in units of banks. Each of the inter-bank reference tables 38a, 38b, 38c and 38d is used, when the corresponding bank is invalidated, to specify the address of a branch instruction that is to be replaced by a branch resolution routine activation instruction in a copy 32 of a cache block of a branch source.

Although FIG. 8 shows only four banks of the first through fourth banks 30a-30d, the same configuration can be employed also in the case where the number of the banks is other than four. Each of the inter-bank reference tables 38a-38d includes a branch instruction address field 72 and a generation number low-order bit field 74. A branch instruction address field 72 contains the local address of an instruction sequence, which includes an instruction providing a branch to a copy 32 of a cache block stored in the corresponding bank, included in a copy 32 of the cache block of the branch source. The instruction sequence described at that local address should be replaced with a branch resolution routine when the corresponding bank is invalidated.

A generation number low-order bit field 74 contains the least significant bit of the generation number of a bank that stores a copy 32 of a cache block containing an instruction sequence including a branch instruction. The generation number stored here is a generation number of a bank of a branch source at the time when the corresponding entry is registered in the inter-bank reference tables 38a-38d. Hereinafter, this generation number is called "generation number of an entry". When a branch resolution routine is activated in a copy 32 of a cache block and the corresponding instruction is replaced with a branch instruction providing a branch to a copy 32 of a cache block stored in the bank corresponding to the table, an entry is additionally registered in the inter-bank reference tables 38a-38d through the branch resolution routine.

If a copy 32 of the cache block of the branch source and a copy 32 of the cache block of the branch target are included in the same bank, since these copies will be invalidated at the same time, the address of the branch source need not be added to the inter-bank reference tables 38a-38d. Accordingly, only when a copy 32 of the cache block of the branch target exists in a different bank, additional registration is made in the inter-bank reference table for the bank, among the tables 38a-38d, through the branch resolution routine activated in the branch source.

The generation number table 39 includes a field corresponding to each of the first through fourth banks 30a-30d, which contains the current generation number of the corresponding bank. The generation number is incremented by one each time the corresponding bank is invalidated. In the example of FIG. 8, the generation numbers of the first bank 30a and second bank 30b are "3", and those of the third bank 30c and fourth bank 30d are "2". When branch instructions providing branches to the address "X" in the second bank 30b are described at the local address "A" in the third bank 30c and the local address "B" in the fourth bank 30d, as also shown in FIG. 8, branch instruction address fields 72 of the inter-bank reference table 38b provided for the second bank 30b contain "A" and "B", while generation number low-order bit fields 74 of the table contain "0" as the least significant bit of "2", which is the generation number of the third bank 30c containing the local address "A" and is also the generation number of the fourth bank 30d containing the local address "B".

Each entry stored in the inter-bank reference tables 38a-38d is used when the corresponding bank among the first through fourth banks 30a-30d is invalidated and a branch instruction in a copy 32 of a cache block of a branch source is replace with a branch resolution routine activation instruction accordingly. However, if the bank storing the copy 32 of the cache block of the branch source has been already invalidated before invalidating the subject bank, the entry itself makes no sense, i.e. the entry is invalid. Accordingly, to determine the validity of each entry stored in the inter-bank reference tables 38a-38d, the generation number low-order bit fields 74 are used.

When the generation number of an entry in the inter-bank reference tables 38a-38d is equal to the current generation number of a bank that includes or included the branch instruction corresponding to the entry, the entry is valid; when they are not equal, it means that a copy 32 of a cache block including the branch instruction has been discarded, and hence, the entry is invalid. In the present embodiment, a generation number of an entry is compared with a current generation number using the least significant bits of the numbers, as will be described later.

Figure 9:
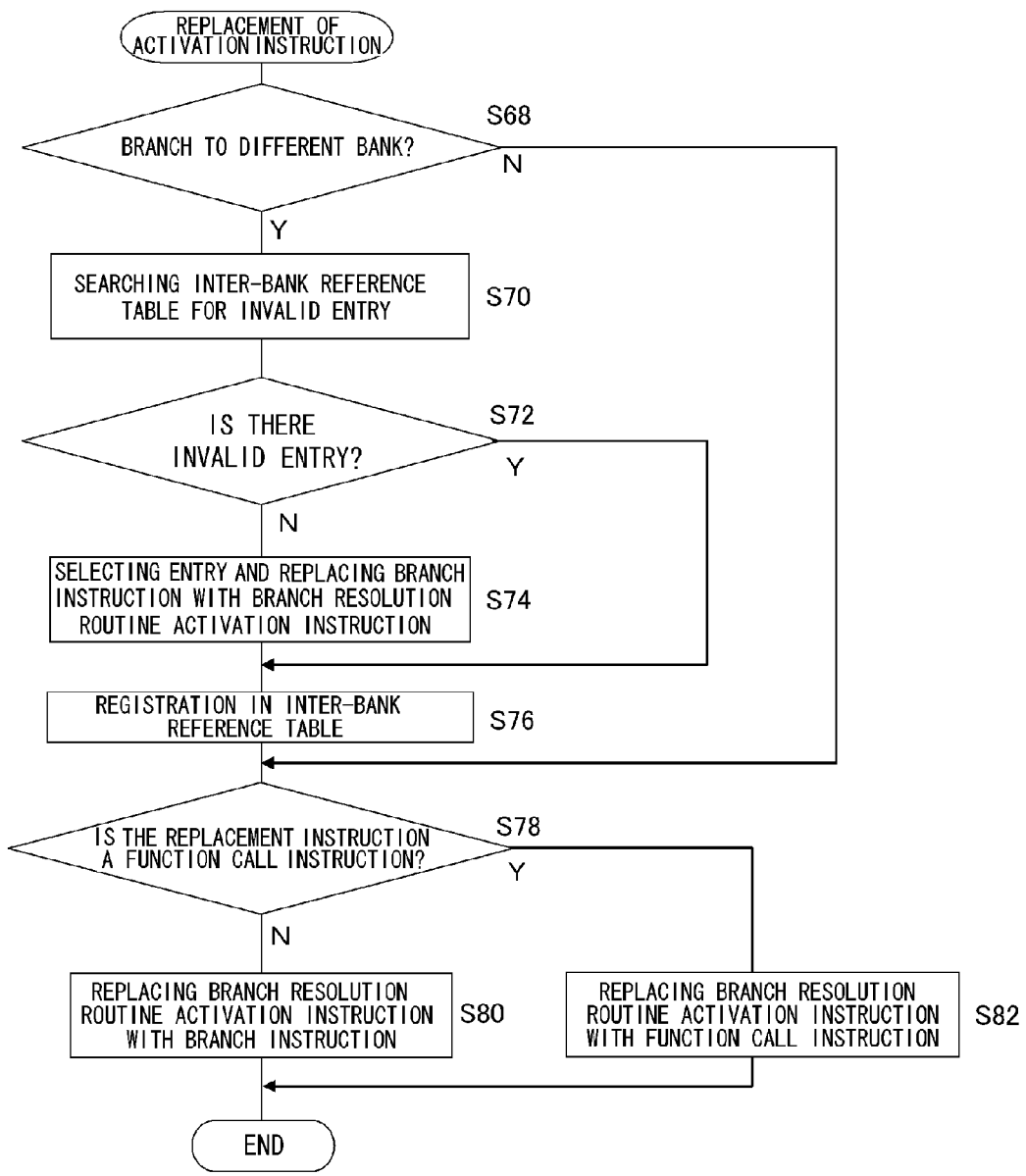
FIG. 9 is a flowchart that shows the procedure for the replacement of a branch resolution routine activation instruction in the embodiment.

Next, there will be described the procedure for the replacement of a branch resolution routine activation instruction shown as S32 in FIG. 7, which includes additional registration of an entry in the inter-bank reference tables 38a-38d. FIG. 9 is a flowchart that shows the procedure for the replacement of a branch resolution routine activation instruction. First, if a branch to a different bank is provided, such as when a copy 32 of a cache block of a branch target is newly stored in a different bank (Y at S68), an invalid entry will be sought in the corresponding inter-bank reference table 38 of the bank (hereinafter referred to as "branch target bank"), e.g. in the inter-bank reference table 38b when the branch target bank is the second bank 30b in FIG. 8 (S70). If there is an invalid entry, such entry is overwritten to add a new entry. If the copy 32 of the cache block of the branch target is included in the same bank (N at S68), the processing of S70-S76 will not be performed as updating of inter-bank reference tables is unnecessary.

The validity of an entry is basically determined by comparing the generation number of the entry with the current generation number of a bank that includes a branch instruction for the entry, as mentioned previously. For the determination, in the present embodiment are used the least significant bit of the generation number of each entry, which is stored in a generation number low-order bit field 74 of an inter-bank reference table 38, and the bank number, provided as the first through nth, of a bank that includes a branch instruction for the entry (hereinafter referred to as "branch source bank"). A bank number can be computed from the local address of a branch instruction stored in the branch instruction address field 72 of each entry.

A bank that has stored a copy 32 of a cache block most lately is now defined as a reference bank. Since the generation number of each bank is incremented by one when the bank is invalidated, the reference bank is a bank of which generation number has been incremented most recently among the first through nth banks 30a-30n. If the values in the generation number table 39 in FIG. 8 are considered, for example, the second bank 30b will be the reference bank. In such case, the first bank 30a, which precedes the second bank 30b and has a smaller bank number than the second bank 30b defined as the reference bank, has a generation number identical with that of the second bank 30b; the third bank 30c or fourth bank 30d, which follows the second bank 30b and has a greater bank number than the second bank 30b, has a generation number smaller by one than that of the second bank 30b defined as the reference bank.

With such characteristic, if the bank number of a branch source bank provided in an entry of an inter-bank reference table 38 is smaller than the bank number of the reference bank, the current generation number of the branch source bank is identical with that of the reference bank. In such case, it is determined that an entry that stores in its generation number low-order bit field 74 a value identical with the least significant bit of the generation number of the reference bank is valid, while an entry that stores in its generation number low-order bit field 74 a value not identical with the least significant bit of the generation number of the reference bank is invalid. On the other hand, if the bank number of the branch source bank is greater than that of the reference bank, the current generation number of the branch source bank is smaller by one than that of the reference bank. In such case, it is determined that an entry that stores in its generation number low-order bit field 74 a value not identical with the least significant bit of the generation number of the reference bank is valid, while an entry that stores in its generation number low-order bit field 74 a value identical with the least significant bit of the generation number of the reference bank is invalid.

Such determination process is repeated for each entry until an invalid entry is detected. Consequently, the generation number of an entry can be compared with the current generation number of a bank corresponding to the entry without searching the generation number table 39, by only using the least significant bit of the generation number of the reference bank and that of the generation number of the entry. Also, the current generation number of a bank corresponding to each entry may be sought in the generation number table 39 so as to be directly compared with a value stored in a generation number low-order bit field 74. By starting a search in the same inter-bank reference table 38b from an entry next to the invalid entry detected the last time, the search process can be made more efficient.

If an invalid entry is detected (Y at S72), the branch instruction address field 72 of the entry will be overwritten with the address at which the branch resolution routine activation instruction currently executed is described, and the generation number low-order bit field 74 of the entry will be overwritten with the current generation number of the bank that stores the copy 32 of the cache block including the branch resolution routine activation instruction, so that the entry will be newly registered in the inter-bank reference table 38 (S76). If no invalid entry is detected (N at S72), priority will be given to the entry to be added, so that one of the entries already registered will be selected and overwritten therewith. Prior thereto, the branch instruction described at the address stored in the branch instruction address field 72 of the selected entry is replaced with a branch resolution routine activation instruction (S74). Then, the new entry is registered in the inter-bank reference table 38 (S76).

Next, based on the identification information regarding the type of the branch stored in the branch type field 58 of the branch target table 64, which is acquired in S20 of FIG. 7, it is determined whether the instruction to be provided as a replacement is a branch instruction or a function call instruction (S78). If it is a branch instruction (N at S78), the branch resolution routine activation instruction will be replaced with the branch instruction (S80); if it is a function call instruction (Y at S78), the branch resolution routine activation instruction will be replaced with the function call instruction (S82). A function call instruction will be described later. Thus, when a copy 32 of a cache block is newly stored in a bank, such as the second bank 30b, additional registration can be made in the inter-bank reference table 38b or the like and a branch instruction to the copy 32 of the cache block can be provided as a replacement through the process stated above.

A function call is different from a simple branch, requiring the return to the original program. When a branch resolution routine is replaced with a function call instruction in S82 of FIG. 9, the branch processing for providing a branch to the branch target instruction as shown in S34 of FIG. 7 requires, prior to the branch, processing for storing in the register 18: the top address of the storage area for the cache block 42 of the source of the call, which contains an instruction sequence to which the process returns from the function, in the main memory 20; the size of the cache block 42; and the offset value from the top address to the address at which the instruction of the return destination is described. Accordingly, a function call instruction provided as a replacement in S82 of FIG. 9 also includes an instruction for executing such processing. The values to be stored in the register 18, as set forth above, can be acquired with reference to the branch target table 64 for the copy 32 of the cache block.

With regard to a branch for returning the process from a called function, on the other hand, the source of the function call is not necessarily one. Therefore, it is unable to provide, as a replacement, a branch instruction in which the address of the branch target in the local memory is specified, as described so far. Accordingly, with respect to each branch for returning the process from a function, the address of a cache block 42 to which the process returns in the local memory 16 may be acquired by searching the address translation table 34 based on the address of such cache block in the main memory 20, which is stored in the register 18. In the present embodiment, however, a link stack is used so as to improve the processing efficiency. A link stack is a stack to be referred to when a function is called and the process is then returned from a copy 32 of a cache block of the branch target to a local address in a copy 32 of a cache block of the source of the call.

Also, there is a case in the present embodiment where a copy 32 of a cache block including an instruction sequence of the return destination is discarded or re-loaded into another area while processing at the branch target is performed. Such case can be recognized when the process returns, by invalidating the corresponding address stored in the link stack.

Figure 10:
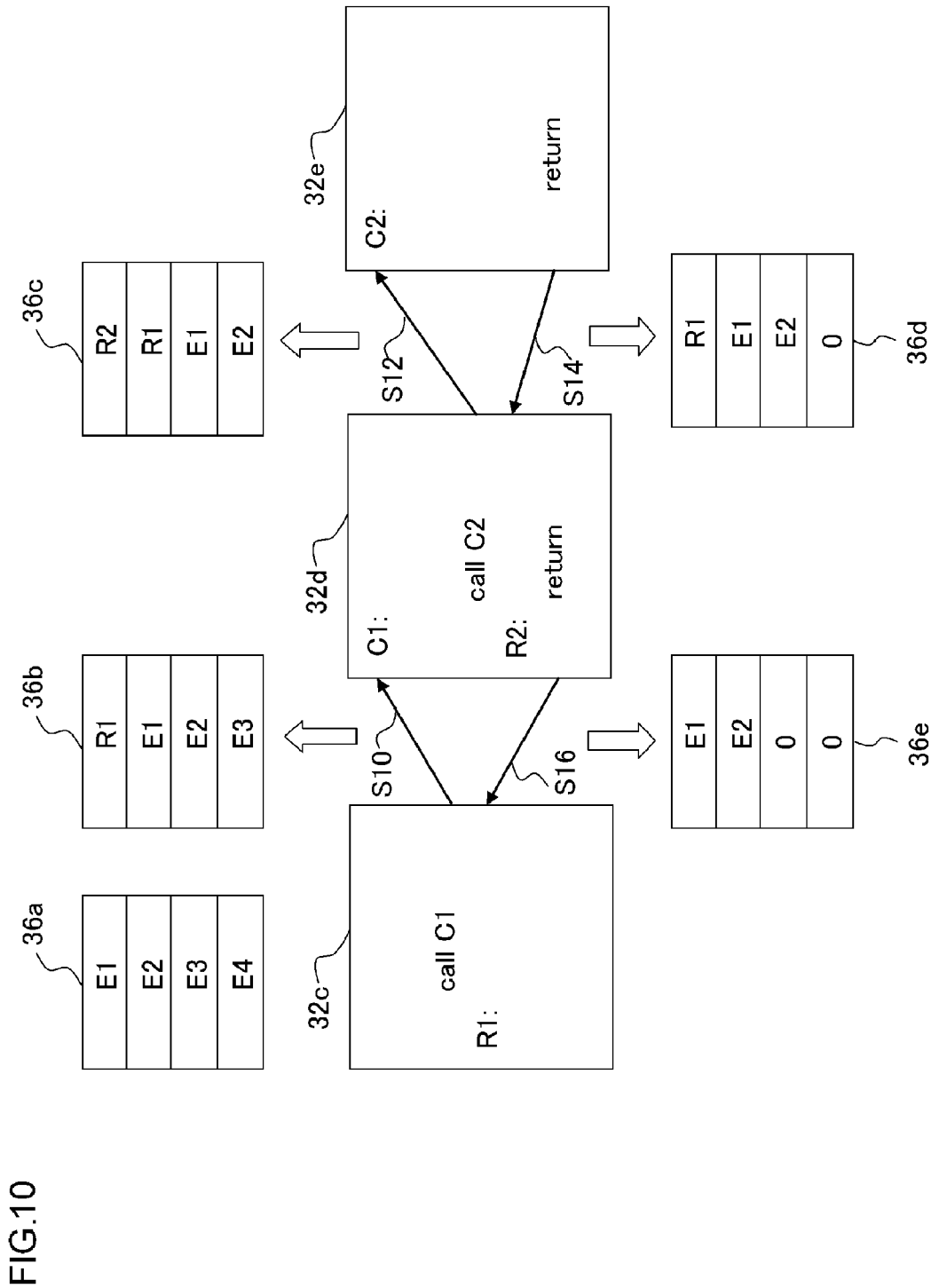
FIG. 10 is a diagram that schematically shows the states of a link stack during function calls and return processes in the embodiment.

FIG. 10 schematically shows the states of a link stack during function calls and return processes. Link stacks 36a-36e show the time-series variation of a single link stack stored in the register 18. Copies 32c-32e of cache blocks are to be serially processed according to function calls, in which the copy 32c calls the copy 32d, and the copy 32d then calls the copy 32e. A link stack may be created for each thread processed by the information processing apparatus 10, but here is shown only a single link stack.

It is assumed here that the link stack 36a is in the initial state. The link stack 36a stores addresses "E4", "E3", "E2" and "E1" of return destinations in copies 32 of cache blocks (not illustrated) in this order. When the processing in the cache block 32c is performed in this state and the process is then caused to branch to an address "C1" in the cache block 32d by an instruction "call C1" (S10), an address "R1" in the cache block 32c to which the process will return is added to the link stack 36a (link stack 36b). Subsequently, the processing in the cache block 32d is performed and when the process is caused to branch to an address "C2" in the cache block 32e by an instruction "call C2" (S12), an address "R2" in the cache block 32d to which the process will return is added to the link stack 36b (link stack 36c).

Then, the processing in the cache block 32e is performed and when the process returns to the cache block 32d according to an instruction "return" (S14), the link stack 36c is referred to, so that the return destination address "R2" can be found in the top entry therein. Consequently, the link stack becomes the state shown as the link stack 36d. Thereafter, the processing in the cache block 32d is performed and when the process returns to the cache block 32c according to an instruction "return" (S16), the link stack 36d is referred to, so that the return destination address "R1" can be found in the top entry therein. As shown in FIG. 10, when there is caused a shortage in the capacity of the link stacks 36a-36e, the oldest entry is deleted.

If the link stacks 36a-36e include an address in a copy 32 of a cache block that is discarded during branch processing, such address will be replaced with an invalid address. The invalid address here is an arbitrary value at which no instruction can be placed. While the copy 32e of the cache block is executed, for example, if the copy 32d of the cache block of the return destination is discarded, the "R2" in the top entry of the link stack 36c will be replaced with "0" or the like. Thus, it can be recognized that the copy 32 of the cache block containing the return destination address has been discarded.

When a copy 32 of a cache block of a return destination is discarded, a branch resolution routine is activated so as to re-load such cache block from the main memory 20 based on the information that has been stored in the register 18 before the function call. Also, instead of an invalid address, the address in the main memory 20 or local memory 16 at which the branch resolution routine is stored may be assigned in the link stack. Accordingly, the process is caused to branch to such address, thereby activating the branch resolution routine directly. Thus, the processing for determining the discard of a copy 32 of a cache block based on whether or not the corresponding address is invalid can be omitted.

Figure 11:
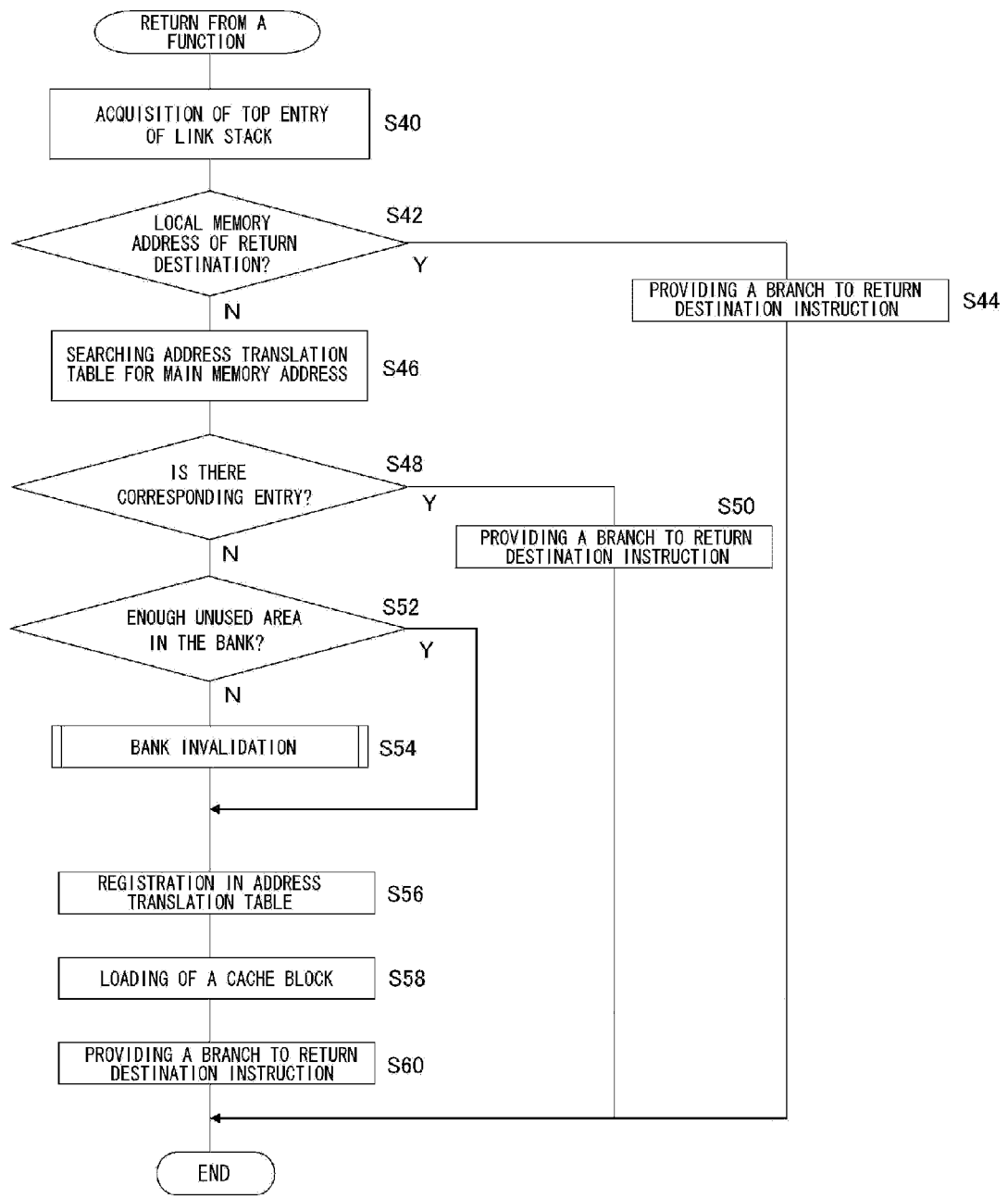
FIG. 11 is a flowchart that shows the procedure for returning the process from a called function in function call processing in the embodiment.

FIG. 11 is a flowchart that shows the procedure for returning the process from a called function using the link stacks 36a-36e as mentioned previously. First, the top entry of, for example, the link stack 36c is acquired, as shown in FIG. 10 (S40). Then, it is determined if the top entry thus acquired is included within an address range where the corresponding copy 32 of the cache block is stored in the local memory 16 (S42). If the entry is included within the address range (Y at S42), it will be determined that the copy 32 of the cache block containing the instruction sequence of the return destination has not been discarded, so that the process will be caused to branch to the return destination instruction described at the acquired address (S44).

If the top entry is "0" or another address that is not included within the address range (N at S42), whether or not the corresponding copy 32 of the cache block is included in the local memory 16 will be first checked by searching the address translation table 34 based on the address of the cache block in the main memory 20 stored in the register 18 (S46). It is because, even if the entry is not included within the address range, there is a case where the copy 32 of the cache block once discarded has been re-loaded, or a case where the entry has been deleted due to a shortage in the capacity of the link stack but the copy 32 of the cache block itself still exists. Accordingly, if the corresponding entry is found in the address translation table 34 (Y at S48), the address of the corresponding copy 32 of the cache block in the local memory 16 is acquired from the table, so as to provide a branch to the return destination instruction based on the offset value stored in the register 18 (S50).

If the corresponding entry is not found in the address translation table 34 (N at S48), it will be determined that the copy 32 of the cache block has been discarded and has not been re-loaded yet, so that the loading process will be initiated. More specifically, as with S24, S26, S28, S30 and S34 in FIG. 7, the capacity of an unused area in a bank is checked (S52), a bank is invalidated if necessary (S54), registration is made in the address translation table 34 (S56), the cache block 42 is loaded (S58), and a branch is provided to the return destination instruction (S60). Accordingly, even if a copy 32 of a cache block including a return destination instruction has been once discarded, the loading process can be performed only when necessary after an efficient search.

Figure 12:
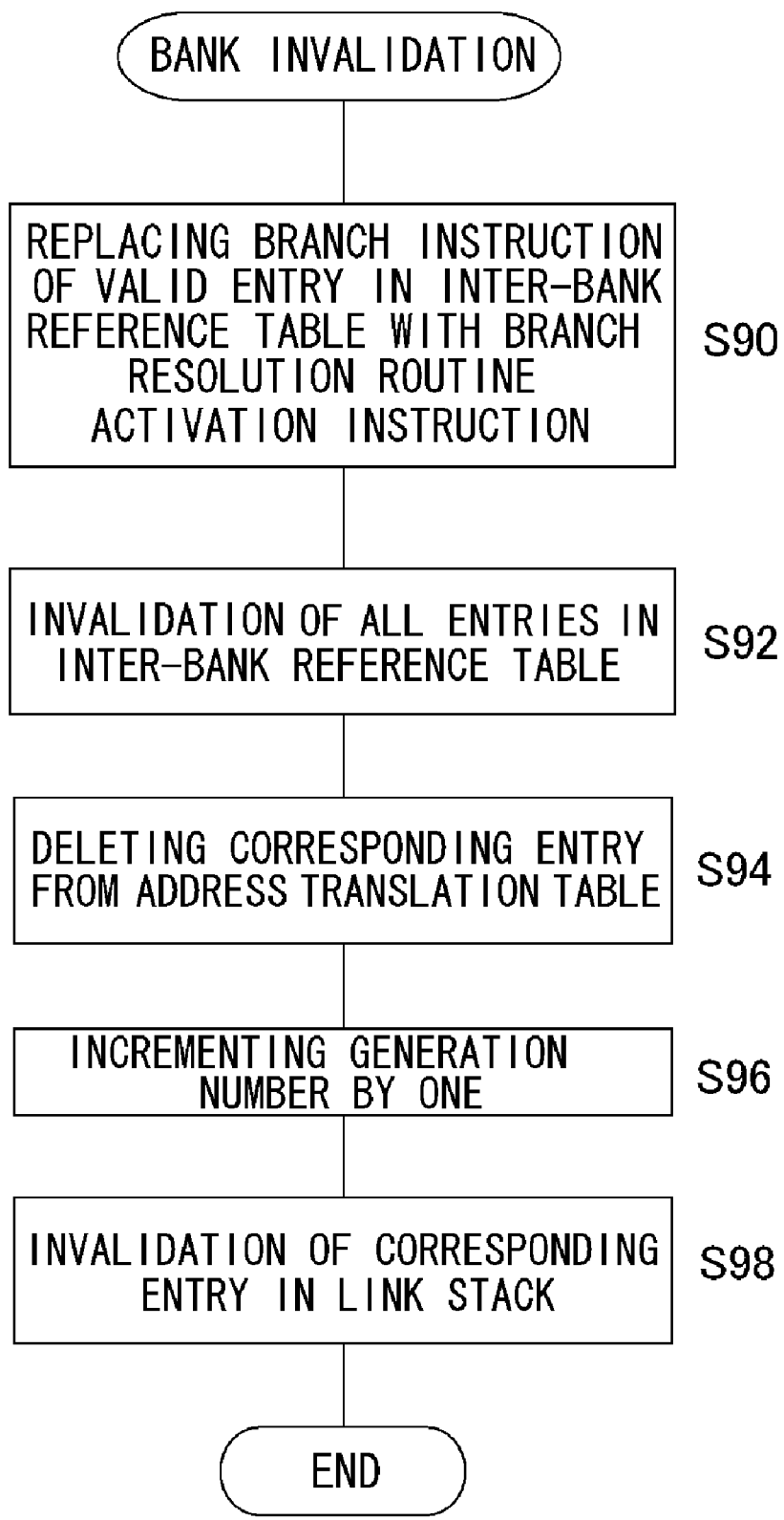
FIG. 12 is a flowchart that shows the procedure of bank invalidation processing in the embodiment.

FIG. 12 is a flowchart that shows the procedure for invalidating a bank, and the second bank 30b is considered here as an example. First, a valid entry is extracted from the inter-bank reference table 38b provided for the second bank 30b, which is to be invalidated, and a branch instruction described at the address stored in the branch instruction address field 72 of the entry is replaced with a branch resolution routine activation instruction (S90). The validity of an entry can be determined using the same logic as described with reference to FIG. 9. Then, an arbitrary address in the second bank 30b and the least significant bit of a generation number are provided in the branch instruction address field 72 and generation number low-order bit field 74, respectively, of each entry in the inter-bank reference table 38b, so as to invalidate all the entries (S92).

Thereafter, based on the connections between entries in the address translation table 34 provided according to the order in which the entries have been loaded, as indicated by the arrow 74 of a dotted line, an entry corresponding to a copy 32 of a cache block in the second bank 30b to be invalidated is deleted (S94). More specifically, when an entry retains a pointer to the entry to be deleted, such pointer is replaced with a constant other than an address. Then, the generation number in a field corresponding to the second bank 30b in the generation number table 39 is incremented by one (S96). Lastly, if the link stacks 36a-36e contain an address in the second bank 30b to be invalidated, such address will be replaced with "0" or the like so as to be invalidated, as stated previously (S98). Thus, invalidation of the second bank 30b can be reflected in a branch resolution routine though the processing above.

According to the present embodiment set forth above, a program is divided into cache blocks, which are units by which a program is loaded into the local memory, and the processor refers to a cache block stored in the local memory to perform processing. Therefore, the processor can refer to a program more quickly than in the case where it accesses a program stored in the main memory, thus reducing the overall processing time.

The division of a program is automatically performed by the compiler based on the size or frequency of use. During compiling, a branch resolution routine activation instruction is also embedded to execute a branch between cache blocks within the local memory. When the branch resolution routine is activated while the program is executed, a cache block is loaded from the main memory, if necessary, and a branch instruction with an address in the local memory is created and written into the cache block. These processes are performed by the compiler, so that the programmer need not divide a program into modules or prepare a program for loading each module into the local memory. Accordingly, fast access to a program can be achieved with less work.

In addition, the discard of cache blocks is managed for each bank in the present embodiment. When a bank is invalidated to load a new cache block, the corresponding inter-bank reference table is used to find all branch instructions providing branches to cache blocks stored in the bank to be invalidated, and to identify the positions of such branch instructions in the cache blocks of the branch sources. Thereafter, the branch instructions are replaced again with branch resolution routine activation instructions. Unlike a common cache memory in which no correlation is found between data stored in cache lines, cache blocks stored in the local memory in the present embodiment have complicated positional correlation. Therefore, discarding a cache block once loaded means destroying the positional relationships established in the local memory, thereby affecting the programs of cache blocks processed anterior or posterior to the discarded cache block. Such complicated condition can be efficiently controlled by managing cache blocks for each bank in terms of generation numbers.

Also, a cache block is certainly provided with a branch target table; when the cache block includes branch processing, the branch target table contains information on a cache block of the branch target, more specifically the address at which the cache block of the branch target is stored in the main memory. In addition, since the address translation table, which shows the relationship between an address in the main memory and an address of a copy in the local memory, is provided within the local memory, the storage area of a cache block or whether or not a copy of the cache block exists in the local memory can be identified at any time by using the address of the cache block in the main memory as identification information. If the address translation table is structured as a hash table, more efficient search will be achieved. In addition, such hash table structure enables easy tracing of the order in which cache blocks have been loaded into the local memory, so that an entry for a cache block that is stored in an invalidated bank can be deleted efficiently.

When the process returns from a function to the original processing in function call processing, a stack is used instead of performing the processing for replacing a branch resolution routine with a branch instruction. Accordingly, even in function call processing in which the return destination cannot be fixed, a program is automatically divided and cache blocks are loaded into the local memory in the same way as in other branch processing, and hence, the same effects can be achieved as stated above.

The present invention has been described with reference to the embodiment. The embodiment above is intended to be illustrative only and it will be obvious to those skilled in the art that various modifications to constituting elements or processes could be developed and that such modifications also fall within the scope of the present invention.

For example, although the present embodiment describes a mode in which cache blocks obtained by dividing a program are loaded from the main memory into the local memory, they may not necessarily be programs as long as they are reference data having positional or dependence relationships between each other, such as segments of a series of data stream or pieces of frame data of a moving image that has been coded using inter-frame prediction.

What is claimed is:

1. An information processing apparatus comprising:
   a compile unit, which divides a program into a plurality of program blocks according to a predetermined rule;
   a main memory, which stores the plurality of program blocks created by the compile unit;
   a local memory contained in a processing unit, into which the processing unit copies one or more program blocks among the plurality of program blocks stored in the main memory as a plurality of copied program blocks, allowing the processing unit to execute the plurality of copied program blocks; and
   a branch resolution routine execution unit that executes a branch resolution routine when, during the execution of one of the plurality of copied program blocks by the processing unit, the execution requires a branch to an instruction that is not described in the copied program block being executed,
   wherein the branch resolution routine determines if the instruction exists in one of the plurality of copied program blocks in local memory, and, if the instruction does not exist in one of the plurality of copied program blocks in local memory, instructs the processing unit to copy into the local memory a program block from the main memory that contains the instruction as a branch target, and
   wherein, after executing the branch resolution routine to copy into local memory the program block from the main memory containing the branch target, the branch resolution routine execution unit adds a branch instruction into the copied program block being executed for providing a branch to the branch target and performs branch processing with reference to the branch instruction.

2. The information processing apparatus according to claim 1, wherein the compile unit embeds an instruction for activating a branch resolution routine into a program block to be executed by the processing unit.

3. The information processing apparatus according to claim 1, wherein:
   the local memory further stores an address translation table in which a base address of a copied program block in the local memory is related to a base address of a respective program block stored in the main memory; and
   the branch resolution routine execution unit, when executing the branch resolution routine, determines if a copy of the program block containing the branch target exists within the local memory by searching the address translation table for a base address of the program block containing the branch target in the main memory, and, if the copy of the program block containing the branch target exists, the processing unit acquires a base address in local memory of the copy of the program block containing the branch target.

4. The information processing apparatus according to claim 3, wherein the address translation table has a structure of a hash table for identifying, on the basis of at least part of the address of a program block in the main memory, the address of a copy of the program block in the local memory.

5. The information processing apparatus according to claim 3, wherein:
   when copying the program block into the local memory, the processing unit also loads a branch target table that contains, with respect to each branch that is necessary for executing the program block to be loaded and directed to an instruction described in another program block as a branch target, the base address in the main memory of the program block of the branch target; and,
   when executing the branch resolution routine, the branch resolution routine execution unit refers to the branch target table to acquire the base address in main memory of the program block containing the branch target and then searches the address translation table.

6. The information processing apparatus according to claim 5, wherein:
   the branch target table further contains, with respect to each branch necessary for executing the program block whose branch target is an instruction described in another program block, an offset value provided as the difference between the base address of the program block containing the branch target in the main memory and the instruction address of a branch target instruction described in the program block containing the branch target; and
   the processing unit computes the address in the local memory of the branch target instruction based on the base address of the copied program block, which contains the branch target in the local memory and which is obtained from the address translation table, and the offset value contained in the branch target table,
   wherein the compile unit embeds a branching instruction into the copied program block being executed for providing a branch to the instruction in the program block containing the branch target.

7. The information processing apparatus according to claim 3, wherein:
   the address translation table further contains, in chronological order, the copies of the program blocks that have been stored in the local memory; and,
   when copying the program block containing the branch target into the local memory by the branch resolution routine, if there is insufficient unused space in the local memory for copying, the processing unit refers to the address translation table and discards one or more copied program blocks stored in the local memory according to chronological order in which the copied program blocks had been stored, so as to ensure that a copy of the program block containing the branch target may be stored.

8. The information processing apparatus according to claim 1, further comprising:
   a register, which stores a stack,
   wherein, when the branch to an instruction that is not described in the copied program block being executed is a call to a returning function, each time the returning function is called, a return destination address in the copy of the program block of the source of the call is stored in the stack of the register, and
   wherein the processing unit acquires the return destination address with reference to the stack in order to perform branch processing for returning the process from the copy of the program block containing the branch target to the copy of the program block containing the source of the call.

9. The information processing apparatus according to claim 8, wherein:
while the returning function is being executed in the copy of the program block containing the branch target, the processing unit replaces the return destination address in the stack with a predetermined invalid address if the copy of the program block containing the source of the call becomes discarded; and
when performing branch processing for returning the process to a copy of a program block containing the source of a call, if the predetermined invalid address is stored in the stack, the processing unit searches an address translation table to determine if the copy of the program block containing the source of the call exists within the local memory, and, if such copy does not exist, the processing unit loads the program block containing the source of the call from the main memory.

10. An information processing method, comprising:
performing processing by referring to a program block stored in a local memory, the program block being formed by dividing a program into a plurality of program blocks according to a predetermined rule;
executing a copying process for copying a separate program block from a main memory into the local memory when there exists in the program block being processed a branch to an instruction contained in the separate program block not stored in the local memory;
after executing the copying process, adding a branch instruction into the program block being processed for providing a branch to the instruction contained in the separate program block; and
branching from the program block being processed to the separate program block with reference to the branch instruction.

11. The information processing method according to claim 10, wherein the branching includes:
writing into the program block being processed a branch instruction for providing a branch to an instruction described in the copied separate program block; and
performing branch processing with reference to the branch instruction.

12. A non-transitory computer-readable storage medium, including thereon a computer program product, comprising:
a module for performing processing by referring to a program block stored in a local memory, the program block being formed by dividing an application program into a plurality of program blocks according to a predetermined rule;
a module for executing a copying process for copying a separate program block from a main memory into the local memory when there exists in the program block being processed a branch to an instruction contained in the separate program block not stored in the local memory;
a module for, after executing the copying process, writing into the program block being processed a branch instruction for providing a branch to an instruction described in the copied separate program block; and
a module for branching from the program block being processed to the copied separate program block with reference to the branch instruction.

* * * * *